3,740,234
METHOD OF PREPARING BARCECUED TURKEY
Billie P. Price and Lane B. Price, both of Rte. 7,
Monroe, N.C.
Filed Jan. 21, 1971, Ser. No. 108,282
Int. Cl. A22c 21/00
U.S. Cl. 99—107                                           2 Claims

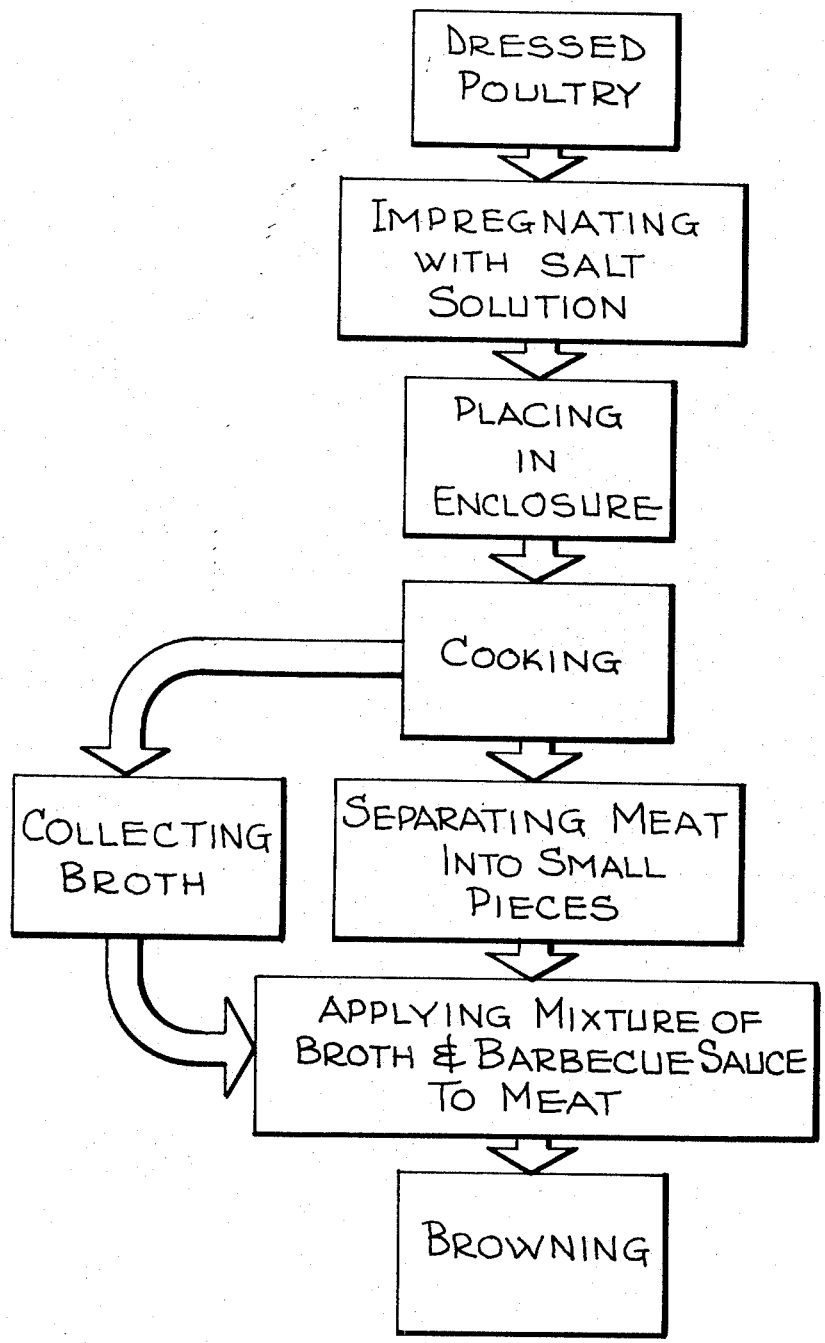

ABSTRACT OF THE DISCLOSURE

A method of preparing barbecued poultry such as turkey which closely simulates barbecued pork comprising impregnating a dressed carcass of poultry with a salt solution and confining the salt impregnated carcass in an enclosure. The confined carcass is cooked while collecting the broth in the enclosure. After cooking, the carcass is removed from the enclosure and the meat thereof separated into relatively small pieces and subjected to a mixture of the collected broth and a barbecue sauce in the presence of heat with the heat providing enhanced penetration of the mixture into the pieces of meat.

---

This invention relates to a method of preparing poultry such as turkey and the product produced thereby and more particularly to a method of preparing barbecued poultry such as turkey which closely simulates barbecued pork.

As is well known, barbecue flavored products are typically prepared from meat, such as pork, which have a coarse cellular grain structure that readily lends themselves to penetration by barbecue sauces and allows the same to intermix with the high natural juice content thereof and provide a very palatable barbecue flavoring thereto. While such barbecue flavored meats are highly palatable to most people, they are relatively expensive as compared to poultry.

Poultry, particularly turkey in contrast to pork is a lean meat and has a relatively low natural juice content and a relatively fine grain meat structure. These inherent qualities have severely limited the methods of preparing poultry, particularly turkey in a palatable form for human consumption. More particularly, these qualities have prevented the preparation of a palatable barbecued poultry product which closely simulates barbecued pork and is as acceptable for human consumption as barbecued pork.

Thus, it is an object of this invention to provide a method of preparing, a palatable barbecued product from relatively inexpensive poultry such as turkey which method overcomes the inherent qualities of poultry mentioned above and that closely simulates barbecued pork.

It has been found by the present invention that a palatable barbecued poultry product which closely simulates barbecued pork may be produced by impregnating salt (sodium chloride) throughout a dressed carcass of poultry, preferably, within the range of from about .0125 to about 0.1 ounce of salt per pound of meat, confining the salt impregnated carcass in an enclosure, cooking the confined carcass while collecting the broth in the enclosure, removing the carcass from the encolsure, separating the meat into relatively small pieces, preferably by chopping the meat to expose the grain thereof, subjecting the pieces of meat to a mixture of the collected broth and a barbecue sauce in the presence of heat with the heat providing enhanced penetration of the mixture into the pieces of meat.

The cooking step preferably includes initially subjecting the confined carcass to a temperature within the range of from about 400° F. to about 600° F. for a relatively short period of time and thereafter to reduced temperature within the range of from about 200° F. to about 350° F. for a prolonged period of time until done. It has been found that this method of cooking improves the texture of the cooked poultry and facilitates in retention of the natural juices therein. However, since a portion of the natural juices of the poultry are driven therefrom during cooking, it is desirable to collect these natural juices or broth and mix the same with the barbecued sauce so that the natural juices are returned with the barbecue sauce to the poultry to further enhance the flavor thereof.

During the penetration of the mixture of broth and barbecue sauce into the small pieces, it is desirable to apply direct heat such as by broiling so as to enhance the penetration of the mixture of broth and barbecue sauce into the pieces of meat. In addition, the direct heat causes a browning of the exposed pieces of meat after absorption of the mixture of broth and barbecue sauce therein. This browning of the pieces of the meat enhances the appearance thereof in closely simulating that of chopped barbecued pork which, as is well known, is characterized by having dark brown pieces of meat interspersed therein.

Some of the objects of the invention having been stated, other objects will appear as the description proceeds when taken in connection with the accompanying drawing, in which—

The figure is a flow diagram of the method of the present invention for preparing barbecued poultry.

In carrying out the method of the present invention, a dressed carcass of a poultry such as a turkey, chicken or the like, is impregnated with salt, preferably in the form of a salt solution which may be injected under pressure into the carcass by suitable means such as a single or plurality of hypodermic syringes at various locations and depths so that the salt will be impregnated throughout the dressed carcass. It has been found that the most palatable product of the present invention is obtained if the salt solution is impregnated within the range of from about .0125 to about 0.1 ounce of salt per pound of meat which salt in addition to seasoning the meat facilitates in retention of the natural juices within the carcass during the cooking thereof and renders a favorable consistency or texture to the meat after cooking.

After impregnating the dressed carcass with salt, the same is closely confined in an enclosure. The enclosure may take on many and numerous forms which while allowing the carcass to be cooked therein, serve the purpose of collecting the broth emitted from the carcass during cooking. By way of example, the impregnated carcass may be securely wrapped with commercially available aluminum foil in conforming relation thereto to enclose the same. As is well known aluminum foil is heat conductive and thus, serves as an excellent heat permeable enclosure for confining the dressed carcass for cooking. While wrapping the impregnated carcass in aluminum foil has proven to be satisfactory, it is preferred that the carcass be hermetically sealed in a confining enclosure. By having the enclosure hermetically sealed, the natural juices emitted from the carcass during cooking are prevented from escaping to the atmosphere and are thus, collected in the enclosure. Furthermore, during cooking, pressure builds up within the hermetically sealed enclosure to reduce the amount of natural juices emitted from the carcass, which has been found to be advantageous.

Such a hermetically sealed confining enclosure is preferably formed of a pliable or flexible plastic material such as polyester film or any other film having high heat resistant properties and which is readily conformable to the contour of the carcass so as to closely confine the same. In addition, it has been found desirable to air evacuate the hermetically sealed enclosure, particularly when the enclosure is formed of a pliable plastic material so that the enclosure will be collapsed or moved into conforming relation to the carcass and thus, act to further reduce the amount of natural juices emitted during cooking.

The confined salt impregnated carcass of poultry is then cooked until done. As previously indicated the preferred cooking comprises initially subjecting the confined carcass to a temperature within the range of from about 400° F. to about 600° F., preferably about 500° F. for a relatively short period of time and then, to a reduced temperature within the range of from about 200° F. to about 300° F., preferably 250° F. for a prolonged period of time until done. It has been found by the present invenion that by first subjecting the confined carcass to an elevated temperature, within the range of from about 400° F. to about 600° F. improves the consistency or texture of the meat after cooking and makes removal of the meat from the bone relatively easy. While the reasons for this are not understood, it is believed that the elevated high temperature causes heat penetration to the bone and thus insures, that the meat adjacent the bone is properly cooked and thus may be readily removed from the bone after cooking. However, the carcass should not be cooked until done at this high temperature because doing so tends to drive the natural juices from the carcass which unfavorably affects the consistency or texture of the cooked meat. It has been found that a cooking time of about one hour at the elevated temperature is satisfactory for most poultry carcasses with the preferred cooking time at the reduced temperature being about one hour for each two to three pounds of poultry meat.

While the salt impregnated into the carcass facilities in retention of the natural juices of the carcass and the confining enclosure lessens the emission of the natural juices during cooking, a portion of the natural juices will be emitted from the carcass. It is desirable in accordance with the present invention to collect these natural juices or broth and return the same to the meat at later step in the method. After the carcass has been cooked, the carcass preferably is allowed to cool and thereafter removed from the confining enclosure. Where the enclosure is hermetically sealed, the carcass should be allowed to cool so that the pressure in the enclosure is equal to atmospheric so that the juices do not escape into the atmosphere upon removal of the carcass from the enclosure. The meat of the carcass is then separated into relatively small pieces. Preferably, the meat is removed from the carcass and finely chopped into small pieces which chopping exposes the grain of the meat.

A barbecue sauce is then obtained, which may be any commercially available barbecue sauce or any prepared desirable mixture of similar ingredients thereof. The broth collected in the confining enclosure during the cooking step is mixed with the barbecue sauce. The relatively small pieces of meat, preferably chopped, are subjected to the mixture of broth and barbecue sauce by any suitable means such as dispensing the small pieces in the mixture of broth and barbecue sauce. With the meat in relatively small pieces, the broth and barbecue sauce mixture readily penetrates into or is absorbed by the small pieces of meat to render a barbecue flavor thereto. To enhance the penetration of the mixture of broth and barbecue sauce into the relatively small pieces, direct heat is applied such as by broiling the dispersed meat. However, it is contemplated in accordance with the present invention that the heat may be applied in other manners such as preheating either or both the pieces of meat and mixture of broth and barbecue sauce. Preferably, as indicated, direct heat is employed such as by broiling which in addition to enhancing the penetration of the barbecue sauce into the pieces effects browning thereof after the mixture of broth and barbecue sauce has penetrated the pieces of meat which further enhances the resulting barbecue flavor thereof. In addition, this browning enhances the appearance of the barbecued poultry product to more closely simulate barbecued pork.

The barbecue flavored poultry is now ready to be eaten or prepared for distribution in accordance with conventional means such as freezing which freezing solidifies the broth and barbecue sauce and retains the same within the pieces of meat so that upon preparing the frozen poultry product for consumption, such as by thawing and heating, the barbecue flavor is retained thereby.

Barbecued poultry produced in accordance with the present invention closely simulates barbecued pork. Upon serving the product to numerous people, they mistook the product for barbecued pork and were surprised to learn that the product was prepared from poultry. Accordingly, in addition to providing a new method of preparing poultry in a palatable form for human consumption, the present invention has provided a barbecued poultry product which closely simulates barbecued pork.

As illustrative of the present invention, a thirty pound dressed carcass of turkey was injected with a salt solution by use of hypodermic syringe at various locations to about .05 ounce of salt per pound of meat. The salt injected turkey was hermetically sealed in an air evacuated plastic enclosure and placed in an open top pan of about 3 inches, depth. The pan and confined turkey carcass were then placed into an oven heated to about 500° F. for 1 hour after which the temperature was reduced to 250° F. and the turkey carcass cooked at that temperature about 11 hours until done. After allowing the carcass to cool, the carcass was removed from the plastic enclosure and the broth that collected therein was placed in a separate container. All the meat, dark and white alike, was removed from the bone of the carcass and chopped with a knife into relatively small pieces. Water was added to the collected broth to make about two quarts which was then mixed with 3½ cups of a barbecue sauce which consisted of a mixture in equal proportions by volume of commercially available Carolina Treat Barbecue Sauce and A–1 Sauce. The pieces of meat were placed back into the pan and the mixture of broth and barbecue sauce was poured over the pieces of meat. The pan was then placed in an oven and the contents thereof broiled until almost all of the mixture of broth and barbecue sauce had penetrated or been absorbed into the pieces of meat and the exposed pieces of meat browned.

While the present invention has been described in connection with processing a dressed carcass of poultry, it is contemplated that the present invention include the similar processing of de-boned poultry products such as turkey rolls and the like. Should such de-boned poultry products be employed, the salt impregnating step may be carried out prior to de-boning, during formation of the de-boned poultry product or after formation thereof in accordance with methods that will be apparent to one skilled in this art.

In the drawing and specification there has been set forth a preferred embodiment of the invention and although specific terms are employed, they are used in a generic and descriptive sense only and not for purposes of limitation, the scope of the invention being defined in the claims.

We claim:
1. A method of preparing barbecue turkey which closely simulates barbecued pork, comprising
injecting a dressed carcass of turkey with a salt solution within the range of from about .0125 to about 0.1 ounce of salt per pound of meat,
hermetically sealing the salt impregnated carcass in a confining enclosure,
cooking the confined carcass by initially subjecting the same to a temperature within the range of from about 400° F. to about 600° F.for about one hour and thereafter, to a reduced temperature within the range of from about 200° F. to about 350° F. for about one hour for each two to three pounds of turkey while collecting the broth emitted from the carcass in the enclosure, allowing the cooked carcass to cool,
removing the cooked carcass from the enclosure,
separating the meat of the carcass into relatively small pieces,
mixing the collected broth with a barbecue sauce,
dispersing the pieces of meat in the mixture of collected broth and barbecue sauce, and
applying heat to the dispersed meat to enhance penetration of the mixture of collected broth and barbecue sauce therethrough.

2. A method of preparing barbecued turkey which closely simulates barbecued pork, comprising impregnating a dressed carcass of turkey with a salt solution within the range of from about .0125 to about 0.1 souce of salt per pound of meat,
confining the salt impregnated carcass in a closely conforming enclosure,
cooking the confined carcass by initially subjecting the same to a temperature within the range of from about 400° F. to about 600° F. for about one hour and thereafter, to a reduced temperature within the range of from about 200° F. to about 350° F. for about one hour for each two to three pounds of turkey while collecting the broth emitted from the carcass in the enclosure,
removing the cooked carcass from the enclosure,
separating the meat of the carcass into relatively small pieces, and
subjecting the pieces of meat to a mixture of the collected broth and a barbecue sauce in the presence of heat, with the heat providing enhanced penetration of the mixture of broth and barbecue sauce into the pieces of meat.

References Cited

UNITED STATES PATENTS 2,844,474   7/1958   Nelson            99—107 X
3,036,922   5/1962   Saverslack        99—107

HYMAN LORD, Primary Examiner